US005924575A

United States Patent [19]

Gigliotti, Jr. et al.

[11] Patent Number: 5,924,575

[45] Date of Patent: Jul. 20, 1999

[54] METHOD AND APPARATUS FOR COLOR-BASED SORTING OF TITANIUM FRAGMENTS

[75] Inventors: Michael Francis Xavier Gigliotti, Jr., Scotia; Mark Gilbert Benz, Burnt Hills; Russell Scott Miller, Ballston Spa, all of N.Y.

[73] Assignee: General Electric Company, Schenectady, N.Y.

[21] Appl. No.: 08/929,396

[22] Filed: Sep. 15, 1997

[51] Int. Cl.[6] .............................. B07C 5/342; G06K 9/00; G06K 9/46

[52] U.S. Cl. .......................... 209/580; 209/939; 382/165; 382/191

[58] Field of Search .................................... 209/580, 581, 209/582, 939; 382/165, 191

[56] References Cited

U.S. PATENT DOCUMENTS

| | | | |
|---|---|---|---|
| 3,804,270 | 4/1974 | Michaud et al. | 209/939 |
| 3,936,188 | 2/1976 | Sawyer | 209/580 |
| 4,278,538 | 7/1981 | Lawrence et al. | 209/581 |
| 4,807,762 | 2/1989 | Illy et al. | 209/580 |
| 4,812,904 | 3/1989 | Maring et al. | 382/165 |
| 4,991,223 | 2/1991 | Bradley | 382/165 |
| 5,085,325 | 2/1992 | Jones et al. . | |
| 5,335,293 | 8/1994 | Vannelli et al. | 209/581 |
| 5,375,177 | 12/1994 | Vaidyanathan et al. | 382/165 |
| 5,432,545 | 7/1995 | Connolly | 209/939 |
| 5,520,290 | 5/1996 | Kumar et al. | 209/580 |
| 5,533,628 | 7/1996 | Tao | 209/580 |
| 5,546,475 | 8/1996 | Bolle et al. | 382/165 |
| 5,641,072 | 6/1997 | Otake | 209/580 |
| 5,676,256 | 10/1997 | Kumar et al. | 209/580 |

*Primary Examiner*—William E. Terrell
*Assistant Examiner*—Joe Dillon, Jr.
*Attorney, Agent, or Firm*—Noreen C. Johnson; Douglas E. Stoner

[57] ABSTRACT

A method for sorting fragments of titanium-based sponge on the basis of color is disclosed. The method involves the steps of capturing at least one color image of each fragment, inserting relevant color values from the image into an automated color-sorting system to determine the color of the fragment, and segregating the fragments according to color or range-of-color, by way of a physical segregation apparatus controlled by the color sorting system. A related apparatus for sorting moving fragments of titanium-based sponge on the basis of color is also described.

19 Claims, 4 Drawing Sheets

METHOD AND APPARATUS FOR COLOR-BASED SORTING OF TITANIUM FRAGMENTS

TECHNICAL FIELD

This invention relates generally to titanium materials. More specifically, it relates to the inspection and sorting of titanium sponge fragments which are obtained during the extraction of titanium from various ores.

BACKGROUND OF THE INVENTION

Titanium is a very important metal for many industrial applications, because of its combination of high strength and relatively low weight. Titanium-based alloys are therefore the material of choice for high performance components, such as compressor discs for aircraft propulsion systems. A wide range of alloys are available, each conferring a particular combination of characteristics to the component.

Titanium is usually obtained from various ores, such as ilmenite, rutile ($TiO_2$), and titanate. Several commercial methods for extracting the metal from the ore are well-known. One general technique involves the reduction of titanium tetrachloride with sodium (the Hunter process) or with magnesium (the Kroll process). Since titanium is highly reactive with oxygen, nitrogen and hydrogen, these processes are usually carried out in vacuum, or in an inert atmosphere like helium or argon. The titanium precipitates as a spongy mass, and can be consolidated by re-melting.

Since titanium is used in alloys intended for critical applications, it is quite clear that the titanium sponge itself must be free of components which would detract from its quality. For example, nitrogen is sometimes present in the alloy in the form of nitrogen-rich "inclusions". These inclusions can shorten the fatigue life of titanium-based alloys, rendering the materials susceptible to failure—especially under high temperature use. Thus, eliminating or reducing the presence of nitrogen is very critical in titanium processes.

Those of skill in the art of titanium refining recognize that the presence of impurities like nitrogen change the color of the titanium sponge (the element itself is usually silvery-white in pure form). Titanium sponge fragments with a desirably low amount of nitrogen, e.g., less than about 1.0 wt. %, usually have a silver or dull gray surface color. Titanium fragments with higher amounts of nitrogen have different colors. For example, fragments with a nitrogen content above about 18.4 wt. % often have a bright yellow color.

These important color distinctions allow the titanium sponge fragments to be separated after being precipitated. Typically, the fragments are passed on a conveyor belt of some sort, while individuals observe the fragments and manually discard those that have colors characteristic of high nitrogen content. (Fragments are discarded for other reasons as well, e.g., if they contain magnesium chloride inclusions that are visible to the eye).

The process of having individuals visually review sponge fragments for color deviation can be quite time-consuming. It can also be labor-intensive if greater amounts of fragments need to be processed, i.e., if the conveyor belt speed needs to be increased, or if multiple conveyor belts are needed.

It should thus be apparent that new techniques for sorting titanium sponge fragments by color would be welcome in the art. These techniques should permit high-speed sorting, with a high level of accuracy. They should also eliminate or minimize the occurrence of human error in the sorting process. Moreover, the techniques should be readily adaptable to a variety of production lines used in ore-processing industries.

SUMMARY OF THE INVENTION

The needs discussed above have been satisfied by way of the discoveries upon which the present invention is based. In one aspect, the invention is directed to a method for sorting fragments of titanium-based sponge on the basis of color, comprising the steps of capturing at least one color image of each fragment, inserting relevant color values from the image into an automated color-sorting system to determine the color of the fragment, and segregating the fragments according to color or range-of-color, by way of a physical segregation apparatus controlled by the color sorting system.

In some preferred embodiments, the method of this invention comprises the following steps:

(A) capturing at least one color image of each titanium fragment as the fragment is advanced on a moving surface;

(B) converting the color image to color signals;

(C) executing a transformation of the color signals into at least one set of selected color values by way of a responsive processor;

(D) comparing the set of selected color values to addressable memory locations in a look-up table, wherein the memory locations have been constructed to correspond to the set of color values for titanium fragments, with a data set stored at each memory location indicating a fragment has acceptable or rejectable color values;

(E) reading out the data set from the look-up table to determine which fragments are to be processed as acceptable or rejectable color values; and (F) controlling the course of titanium fragments on the moving surface, based on data read from the look-up table, to separate the fragments on the basis of the color values.

Color sorting systems suitable for this invention are discussed in further detail below. Most involve the conversion of color images from the fragments into color signals which are in turn transformed into color values. (The color images are usually represented by a pattern of pixels). The color values are automatically compared to values which are part of a look-up table based on data sets which embrace acceptable or rejectable color values. Comparison of color values determined for the fragments with those in the look-up table results in the acceptance or rejection of each fragment.

Yet another aspect of this invention is directed to an apparatus for sorting moving fragments of titanium-based sponge on the basis of color. In general, such an apparatus comprises the following elements:

(i) a device or series of coordinated devices capable of determining the color or range of color for each fragment as the fragment is advanced on a moving surface, said device recognizing whether the fragment has acceptable or rejectable color characteristics; and (ii) a mechanism for moving each titanium fragment to a directed site, based on the recognized color characteristics of the fragment.

In some preferred embodiments, the apparatus comprises:

(I) a device capable of capturing an image of the titanium fragments;

(II) a look-up table with addressable memory locations corresponding to color values associated with each fragment, with an indicating data set stored at each of said locations indicating whether a fragment or portion thereof has acceptable or rejectable color values;

(III) normalizing means for providing normalized color values of the image from the image-capturing device;

(IV) addressing means using the normalized color values for addressing the look-up table;

(V) memory means responsive to the stored data set in the look-up table locations corresponding to the captured image of the fragments, for storing processing data used to process the moving fragments; and (VI) controlling means for moving each titanium fragment to a directed site, based on the determined color of the fragment.

As described below, the apparatus and process of this invention permit high-speed color sorting of titanium sponge fragments, with a high level of accuracy.

Numerous other details regarding these and other embodiments of the present invention are provided below.

DETAILED DESCRIPTION OF THE INVENTION

As alluded to above, the presence of nitrogen provides the titanium sponge fragments with a distinctive color: gold, yellow, brown, or shades or combinations of these colors, as opposed to the natural color of silver or dull gray. The present inventors have discovered that an automated color-sorting system is capable of distinguishing the natural color of the sponge fragments from the other colors.

Figure 1:
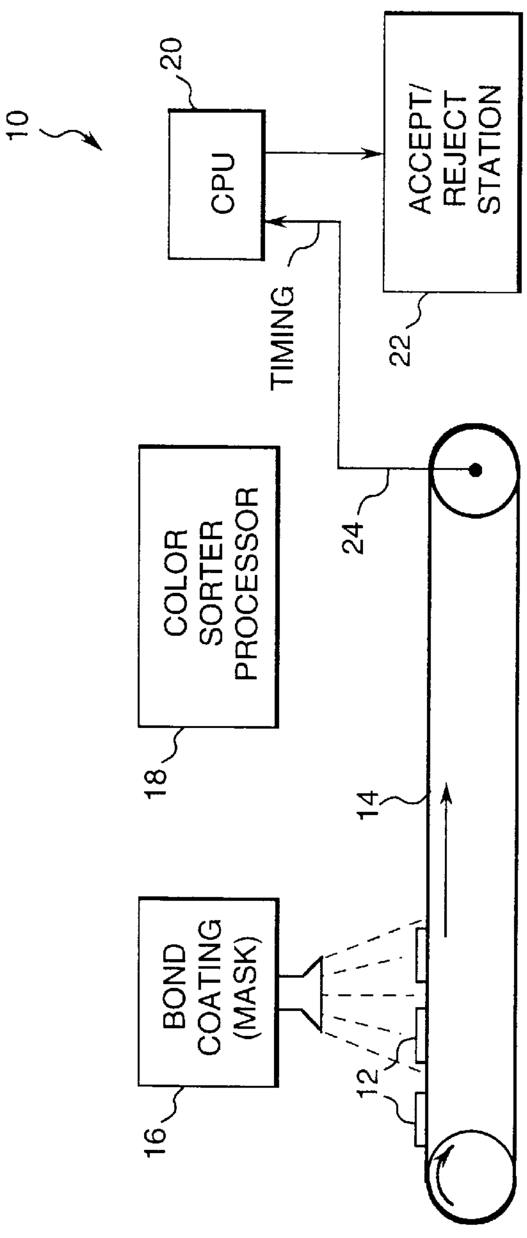
FIG. 1 is a block diagram of sponge fragments on a conveyor belt being sorted by the method and apparatus of the present invention.

In general, color sorting systems which are useful for carrying out the process of this invention are known in the art. Many of the relevant concepts are described in various texts, such as *Image Processing, Analysis and Machine Vision,* by M. Sonka et al, Chapman & Hall Computing (1993) and *Machine Vision,* by M. Ejiri, Gordon and Breach Science Publishers (1989). The teachings in both of these texts are incorporated herein by reference. Commercial product handbooks are also instructive. The following references of this type are also incorporated herein by reference: The 1993 *Applications Handbook* ("The How-To Book of Image Processing and Data Acquisition"), V. 2., No. 1, and the 1993 *Product Handbook* ("The Book of Data Acquisition and Image Processing"), Vol. 3., No. 1, both available from Data Translation®, Inc. Moreover, various patents are also very relevant to color sorting systems, such as U.S. Pat. Nos. 5,533,628 (Tao), 5,085,325 (Jones et al), and 5,021,645 (Satula et al), which are all incorporated herein by reference. FIG. 1 is a simplified block diagram of a suitable system 10. Titanium sponge fragments 12, usually obtained from titanium ore 11 in one of the extraction processes 13 set forth above, move on a conveyor belt 14. At least one image of each fragment is captured by an electronic imaging device 16.

A variety of imaging devices may be used. The device must be capable of capturing a color image of the sponge fragments. Moreover, the device, or an attached component, must be capable of converting the color image into electronically-discretized values which can be analyzed by a computer. The device could be any type of camera, but is usually a video camera, e.g., a red-green-blue (RGB) camera which provides RGB signals for storage in memory. The detector-portion of the device (or an attachment to the device) is often itself a charge coupled device (CCD). Video cameras with an attached- or built-in component of this type are often referred to as "CCD cameras". Other types of detectors are known in the art and could alternatively be used for this invention, e.g., CMOS (Complementary Metal Oxide Semiconductor) devices or CID's (Charge Injection Devices). The imaging device could also include a flash attachment. The color images captured by imaging device 16 are processed by a color sorter processor 18, which is generally controlled by a central processor unit (CPU) 20. The CPU controls accept/reject station 22, which separates undesirable sponge fragments (i.e., element 23) from those which are acceptable (i.e., element 25), as further described below.

Other features are also possible, but need not be described in detail here. For example, the sponge fragments could be supported on spinning or rotating platforms situated on the conveyor, so that multiple images of each fragment could be captured and processed. Moreover, various types of synchronization systems are usually employed. For example, a timing feedback connection 24 controls timing relative to the location of the moving fragments, thereby providing for the proper disposition of the fragment at the accept/reject station. This type of feedback connection is well-known in the art, and may consist of an output from a rotating pulse, for example. Furthermore, multiple sorting lanes could be utilized, with each lane being exposed to the view of at least one video camera.

The color image of each titanium fragment, consisting of a pattern of individual image elements or "pixels", is converted to a color signal by color processor 18, as shown in FIG. 1. The processor, controlled by CPU 20, executes a transformation of the color signals into at least one set of selected color values. The functional relationship between the color processor and the CPU is based on conventional electrical/computer designs for image analysis, and need not be discussed in detail here. The previously-mentioned U.S. Pat. No. 5,085,325 provides a diagrammatic description of a typical system which includes a color sorter communicating with a CPU. Those skilled in the art understand that it may be possible to combine the color processor 18 and CPU 20 into one component which carries out all of the functions of the separate components. However, the present description assumes that the components are separate.

In brief, the color processor usually includes amplifiers through which red, green and blue (RGB) outputs from the imaging device are passed. The outputs are converted to a digital representation, e.g., 8-bit words, by a conventional analog-to-digital converter. The amplifiers permit an on-line gain adjustment to take place on a pixel-to-pixel (picture element) basis.

In addition to being transformed into RGB outputs, the color signals can also be transformed into another coordinate system through which color is often expressed: hue, saturation, and intensity (HSI). The concept of HSI is well-known to those familiar with digital imaging, and is described in some of the references mentioned above, e.g., the Sonka text and U.S. Pat. No. 5,533,628. In brief, intensity is the sum of the R, G and B components, while hue is a value which is approximately equal to the average wavelength in the appropriate spectrum. Saturation is usually defined as a measurement of the deficit of white color. The color processor can transform RGB signals into the HSI domain.

As described below, the HSI domain is sometimes used, by itself or in conjunction with the RGB domain, to set threshold values for each of the color components. (As further described in the examples, ratio's between various coordinate values are sometimes used in an algorithmic routine to distinguish colored fragments, e.g., the ratio of intensity to saturation for a given sample.)

In some embodiments, the significant bits of the output lines from the analog-to-digital converter can be grouped to form an address word in a register, forming an address vector. This vector then addresses a look-up table, or multiple look-up tables, which are based on specific color values for the pixel being processed at that time. Look-up tables are also well-known in the art. Preferably, each table has a significant memory capacity, e.g., 256 bytes, so that each color image can be addressed and processed at a video rate.

As comprehensively described in U.S. Pat. No. 5,085,325 (Jones et al.), the look-up table stores bits of information having a value of 0 or 1 for each pixel. This data can be sequentially read out and stored in a correlation memory. In this manner, the output of the look-up table corresponds on a 1-to-1 basis to the selected address and correlation memory, which can be under the control of a video timing input. Moreover, the correlation memory can also be linked to the CPU so that it effectively contains a representation of the original image taken by the imaging device.

U.S. Pat. No. 5,085,325 also provides useful illustrations as to the representation of color values in the binary system, stored as data in the look-up table. When the table is addressed and the data read out, groups of "1's" or "0's" would appear, depending on the designed selection criteria. Thus, the correlation memory which stores this data provides an electronic image, on an on-line basis, of the "snapshot" taken by the imaging device.

Moreover, the Jones patent also provides a useful illustration of a sort-or-reject routine which is accomplished by the CPU. The routine includes the step of reading the contents of the correlation memory and then evaluating the "1" bits to determine if the number of contiguous bits is greater than a predetermined constant K. If so, then the items (e.g., titanium fragments) which correspond to the images upon which the correlation data is based would be physically rejected by the sending of an appropriate signal to accept/reject station 22 in FIG. 1.

In fact, various types of sort-or-reject routines can be utilized, and the selection of a particular routine depends in part on the samples being analyzed. As described in the examples, simple algorithms can be constructed for a computerized color sorting system for titanium sponge fragments. The algorithms are based on data already incorporated into the look-up table, e.g., RGB and/or HSI values based on test samples. Briefly, yellow fragments could be separated from brown-gray samples according to an algorithm which, in effect, states: when the intensity value is greater than the saturation value, a yellow sample has been identified, and when the intensity value is less than the saturation value, a brown-gray sample has been identified.

As further described in the examples, a collection of titanium fragments of various colors might require more than one "separation pass", e.g., using multiple algorithms. As an illustration, the collection could first be separated into two groups, based on intensity and saturation values. One of these groups might contain the desired fragments, i.e., those having a silver color indicative of very low nitrogen levels. However, this group might also contain indistinguishable fragments of another color, e.g., yellow fragments which usually possess a high-nitrogen content. In this instance, a second parameter might be used to separate the yellow samples from the desired samples. As described below, this parameter might be based on comparative hue values, which often provide the necessary distinction between the samples in this group. A simple algorithm based on hue values could easily be incorporated into the color processor, thereby resulting in complete sorting of the desirable fragments from the undesirable fragments.

Other factors regarding the processing of a color signal are known to those skilled in the art. For example, the Jones patent describes procedures for adjusting the gain in the output amplifiers. Such an adjustment allows amplitudes to be normalized to correct for various optical problems, such as variations in camera lenses for the imaging device, and nonuniformity of the lighting field. If not corrected or compensated for, these variations could cause undesirable variations in a look-up table address when the same color was present in the image field. An exemplary technique for normalizing gain correction is set forth in Jones.

Before the process of the present invention is operational, the look-up table (or multiple look-up tables) must be loaded with the proper data. This is the step in which the system "learns" which colors for sponge fragments are to be accepted, and/or which colors are to be rejected. When loaded, the look-up table can be organized by colors, with a separate memory location or cell for each color which is recognized by the system. At each memory location, a bit is stored to indicate whether the particular color is acceptable or not. For example, a "0" could designate an acceptable color, while a "1" designates a rejectable color. As further described below, a multi-bit word containing the color information for each successive pixel can be applied to the look-up table as an address vector, and the output of the look-up table is a one-bit word which indicates whether the color of the particular pixel is acceptable.

As further outlined in the examples below, the color data for titanium sponge fragments can be segmented into various classes. Fragments which have a high-nitrogen content, i.e., above about 18.4 wt. %, usually have a bright yellow color. Fragments having a mid-nitrogen content, i.e., between about 1 wt. % and about 18.4 wt. %, usually fall into one of three color categories: brown, reddish brown, or gray-brown. Normal, desirable sponge fragments having a minimum of nitrogen, i.e., less than about 1 wt. %, are silver or dull gray in color. Color values associated with each of the color classes could be loaded into the look-up table by one of the procedures set forth below.

Clearly, there is some subjectivity in examining a sample with the human eye and then assigning an exact color to it. (There is occasionally some overlap between the colors, relative to nitrogen content.) However, as shown in the examples which follow, relative color distinctions between titanium fragment samples can be made, regardless of the actual named color. These relative distinctions are sufficiently unambiguous to readily set up data parameters for the color sorting system, as described herein.

In some embodiments of this invention, only two color classifications are required for efficient sorting of titanium sponge fragments. In other words, fragments colored silver or dull gray are designated as being acceptable, while fragments having any other color would be designated as being rejectable. In these embodiments, the loading of color data associated with the two broad classes would be relatively straightforward. As discussed previously, the output from the color processor would then be analyzed via the RGB and/or the HSI coordinate systems.

In general, various procedures for loading the look-up table are known to those skilled in the art. For example, color values associated with the titanium sponge fragments could be theoretically selected. The table would then be loaded with any computable number which, if it has a relationship to the output of the imaging device, will provide for effective sorting.

Alternatively, an empirical approach could be undertaken, utilizing the color values in the actual fragments moving on the conveyor belt to set up the look-up table. Such an approach is also described in considerable detail in the Jones patent. Briefly, flash images of the fragments would first be captured and placed in image video RAM (random access memory) cells. A graphical signal processor and a mouse could then be used to direct a cursor to cover a selected group of pixels, which would be visible on a view screen (e.g., a monitor) of the imaging device. The view screen would be loaded from the same output signal as the image RAMs. Since the image on the view screen corresponds exactly to that which is stored in the RAMs, the selected pixel group can be read into the look-up table by the graphical signal processor. The pixel values would usually be loaded into the look-up table. Loading could then be continued, with additional groups of pixels representing additional color values which require processing.

As mentioned previously, multiple look-up tables can be used in the process of this invention. Various arrangements for the tables would be apparent to those skilled in computerized image processing. In some embodiments, two primary look-up tables would be utilized. The first look-up table is loaded with color value data which, in effect, circumscribes acceptable color values. (The table could alternatively circumscribe unacceptable color values). The parameters used in loading this look-up table are of course based on the material being sorted, e.g., titanium fragments with desirable colors or undesirable colors. The color space can be segmented in any convenient manner, e.g., 24 bit, 3-color pixel values. Computer software, such as the Adobe Photoshop™ imaging program mentioned below, allows the user to set and adjust color threshold limits as various sample fragments are imaged or "blinked".

A second look-up table is usually incorporated into the concluding sorting steps, e.g., immediately preceding the accept/reject station. The function of this look-up table is much simpler, because essentially all of the color data analysis has already occurred. The result of that analysis is, in effect, transformed into "1 or 0" criteria, i.e., to accept or reject the particular fragment.

As alluded to earlier, a variety of factors might affect actual color values. For example, system noise and optical variations might be present. Even if lighting is uniform, the surface structure of the titanium fragments may cause light to be reflected in a specular manner. Thus, the light might diffuse away from the sample in various ways to produce variations in a perceived color, as seen by the system. Moreover, the titanium sponge fragments themselves exhibit a range of colors, as mentioned previously.

Thus, in some embodiments of this invention, compensation routines might be incorporated into the look-up table loading system, via the signal processor and the CPU. For example, the look-up table could be expanded around a theoretically designated color value, to a range of color values. This expansion band provided around typical RGB values allows the system to effectively sort on those values.

When using the empirical approach to load the look-up table, a "blinking" technique may also be employed, as described in the Jones patent. In this technique, the image of a selection of titanium fragments would be displayed on the view screen of the imaging device. Color values corresponding to the fragments would then be visually blinked, based on their designation as acceptable or unacceptable. Those skilled in computer systems will readily be able to provide a suitable electronic connection between a blink control unit and related components, e.g., the graphical signal processor and a timing control unit.

Other details regarding various techniques for loading a look-up table are further described in the Jones patent, and need not be exhaustively dealt with here. For example, values for red, green and blue components can be computer-plotted along the axes of a three dimensional Cartesian coordinate system. A graphical cube would be constructed, having one corner at the origin and three of its edges extending along the R, G and B axes between the values 0 and maximum-acceptable values for R, G and B (e.g., $R_{MAX}$, $G_{MAX}$, and $B_{MAX}$, respectively). A spherical coordinate system could alternatively be used.

Once the contents of the look-up table have been set initially to 1's, the starting address for the look-up table is usually initialized to a suitable starting address. A "seed" color may then be obtained by finding the mean RGB color components within a selected area. A range of acceptable colors can then be defined, using selected starting values for red, blue and green. Then, according to one possible technique, a series of loops are executed to generate all of the possible combinations of R, G and B in the range of acceptable colors. As further described in the Jones patent, a series of calculations can be made to enter various acceptable color values into the look-up table, as successive passes through the loops are carried out.

Alternative methods of loading a look-up table are also illustrated in the Jones patent. For example, histograms and statistical analysis can be used. Briefly, histograms would be generated for good titanium sponge fragments and bad titanium sponge fragments. Each histogram could comprise a table in which the number of times each color occurs in the fragment is recorded. Data from a plurality of frames can be added together to provide large statistical samples of the colors which occur on "good" fragments, and the colors which occur on "bad" fragments. Channels are constructed, which include a memory in which a histogram for the fragment is created. For example, each memory could include 262,000 addressable locations of 16 bits each. During construction of the histograms, pixel data for a given fragment is applied to the address lines of the appropriate memory, e.g., by input switches and load/unload switches that can be implemented in software. An address sequencer may be provided for unloading data from the histogram memories and for loading data into the look-up table. Moreover, means can be readily provided for "smoothing" the histogram data from the various memories, as described in Jones.

Figure 2:
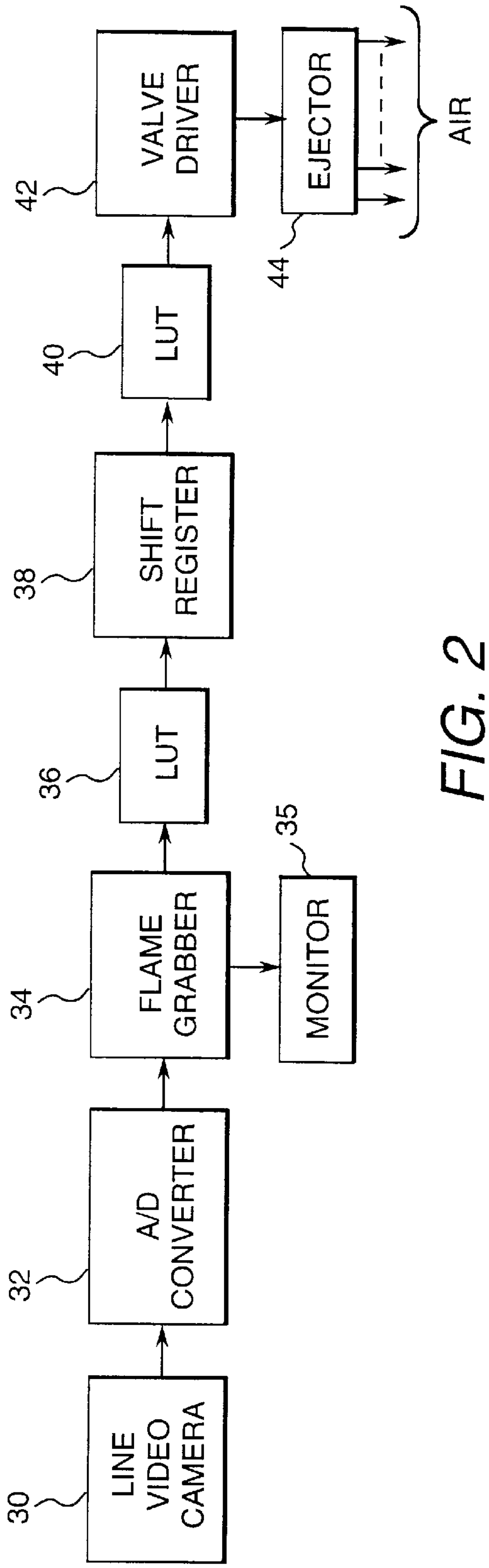
FIG. 2 is a simplified block diagram of one embodiment of a system for color-sorting sponge fragments according to this invention.

FIG. 2 is a simplified block diagram of one exemplary color-sorting system based on this invention. It includes some elements discussed previously, and some which will be discussed hereinafter. A line scan video camera 30 could include an array of photosensors such as charge coupled devices, which receive light from a plurality of discrete photo sites. The photo sites are located on a "scan line" which usually extends in a direction generally perpendicular to the movement of the items being sorted, i.e., the titanium sponge fragments moving on the conveyor belt depicted in FIG. 1. Each scan line would contain a suitable number of pixels and photo sites appropriate to the nature of the items being scanned. For example, a scan line could contain about 864 pixels and three photo sites (red, green, and blue). When the conveyor belt moves, successive readings of the photosensors would be taken to provide data for different scan lines. The data would be processed in frames which could consist of any desired number of scan lines.

With continued reference to FIG. 2, the output signals from the video camera would then be normalized and applied to analog-to-digital (A/D) converter 32. As discussed previously, the most significant bits (a pre-selected quantity like six bits) of the three colors, e.g., RGB, in each pixel would then be combined to form a word. The word could consist of 18 bits, for example. The output of the A/D converter would be applied to frame grabber 34, which includes means for storing the digitized color information for each pixel. The frame grabber can also include a graphics signal processor (GSP) and a look-up table (LUT), neither of which are specifically shown in the drawing. A video monitor 35 receives the video information from the frame grabber and provides a video display of whatever is being scanned by the camera on a frame-by-frame basis.

In this non-limiting, exemplary embodiment, the information in the look-up table within the frame grabber can be copied into another look-up table 36, which can actually comprise any number of look-up tables. The output of look-up table 36 is applied to the input of a shift register 38, and the output of the shift register is applied to the address line of an additional look-up table 40. According to this arrangement, shift register 38 and look-up table 40 form a spatial filter which causes an item on the conveyor belt to be rejected only if it has a certain number or sequence of unacceptable colors. The shift register converts the single bit output stream from look-up table 36 to a series of 16 bit words which are applied to look-up table 40 as address vectors. Table 40 could be set up to provide an output signal if at least a given number of bits in the address word from table 36 are 1's. Moreover, table 40 could be set up to provide an output only if the 1's occur in a predetermined sequence in the address word.

As shown in FIG. 2, the output signal from look-up table 40 can be applied to a valve driver 42. The valve driver controls the discharge of air through a plurality of nozzles in an ejector unit 44. The air jets from these nozzles divert fragments being separated (e.g., rejected sponge fragments) from the normal path of the conveyor, directing them to a reject area.

Those skilled in the art of automated sorting systems understand, however, that other means of separating the rejected sponge fragments are possible. For example, a push stick (rather than the air discharge component) could be set up to respond to the output signal from look-up table 40. All of the physical separation techniques would of course advantageously be controlled by the CPU.

It should be clear from the preceding discussion, as well as the examples which are included in this specification, that elements of the present invention can also be expressed by representing images of the titanium fragments as patterns of pixels, and then distinguishing the fragments on that basis, using a computerized color sorting system. Thus, another embodiment of this invention is directed to a method of analyzing and processing moving fragments of titanium sponge corresponding to images represented by a pattern of pixels, each pixel having a value, comprising the following steps:

(i) capturing one of the images;

(ii) designating pixels within the image as satisfying a criterion for processing the moving fragments;

(iii) expanding around the value of the designated pixels a range of pixel values to compensate for any system noise, range-of-color variation, or range-of-optical variations;

(iv) storing a data set within a look-up table which corresponds to look-up table locations addressed by said range of pixel values; and (v) reading out the data set from the look-up table locations and determining said processing of moving titanium fragments or portions thereof, based on said criterion represented by the read-out data set.

The titanium fragments can be passed in front of an imaging device at a pre-selected speed, and the images are taken at a rate dependent on the speed of the moving fragments. The fragments are analyzed and sorted according to perceived color, based on the previously described relationship between color and nitrogen content. As described previously, the look-up table can be constructed from a pre-selected set of values derived from a previously measured set of pixel values.

The value for each pixel would be expressed in terms of at least one set of selected color values, e.g., the RGB coordinate system, and in some preferred embodiments, the HSI coordinate system. In one embodiment, each pixel value would be digitized (e.g., at a video pixel read-out rate) into a numerical value corresponding to its color shade, which represents an address in the look-up table. Processing can be carried out by a predetermined algorithm relating to the contiguous relationship of pixel data from the look-up table.

Sometimes, normalization techniques are employed, e.g., normalizing each pixel value in the captured image. This may be useful when lighting is not uniform, for example. A target with known color characteristics could be placed in the picture. If the resulting image does not exhibit those characteristics, the user would know that some irregularity in lighting or equipment parameters may be present. A normalization routine applied to the entire image would compensate for the irregularity, allowing processing of the image to continue.

EXAMPLES

These examples are merely illustrative, and should not be construed to be any sort of limitation on the scope of the claimed invention. All parts are provided in weight percent, unless otherwise indicated.

Example 1

Eight samples of titanium sponge fragments obtained from a commercial titanium reduction process were examined. The samples were each approximately 0.5 cm in diameter. Since the samples contained varying degrees of nitrogen, they exhibited various colors:

TABLE 1

| Sample No. | Surface Color | Nitrogen Level* |
|---|---|---|
| 1 | Bright Yellow | High-Nitrogen |
| 2 | Brown | Mid-Nitrogen |
| 3 | Reddish Brown | Mid-Nitrogen |
| 4 | Gray-Brown | Mid-Nitrogen |
| 5 | Silver | Low-Nitrogen |
| 6 | Brown | Mid-Nitrogen |
| 7 | Silver | Low-Nitrogen |
| 8 | Gray-Brown | Mid-Nitrogen |

*"High-Nitrogen" = nitrogen content above about 18.4 wt. %.
"Mid-Nitrogen" = nitrogen content between about 1 wt. % and about 18.4 wt. %.
"Low-Nitrogen" = nitrogen content less than about 1 wt. %, i.e., the normal, preferred type of titanium sponge.

Figure 3:
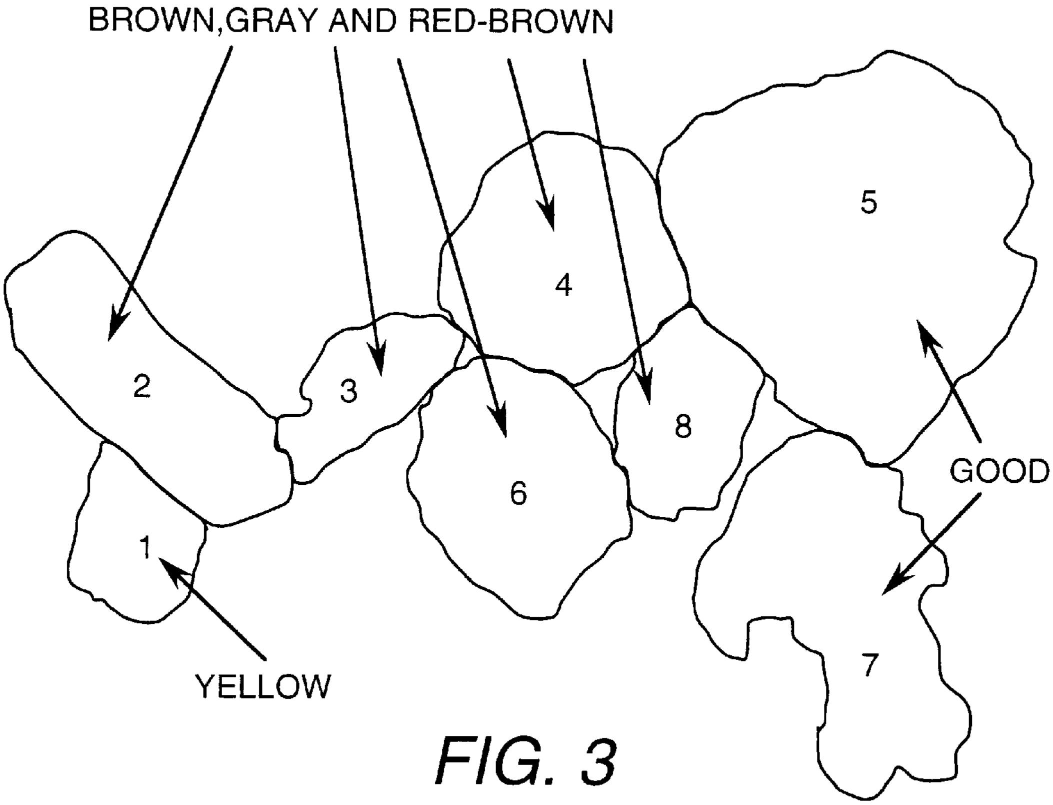
FIG. 3 is a tracing of a color photograph of various titanium sponge fragments which are to be sorted.

All of the samples were placed on a substrate with a blue-colored background. A picture of the collection of samples was then taken with a conventional color CCD camera to which a frame-grabber was attached. The frame grabber was a device made by Data Translation, Inc., Model DT 2871. Ambient lighting was provided by a tungsten-halogen light which was fitted with a cold filter capable of taking out long-wavelength (IR) light. The light was transmitted by way of a fiber optic ring-lighting system attached to the camera lens. FIG. 3 is a tracing of one of the color photographs taken with the camera. The color of the individual sample fragments is noted on the drawing, and numerals have been provided to arbitrarily designate each sample.

Figure 4:
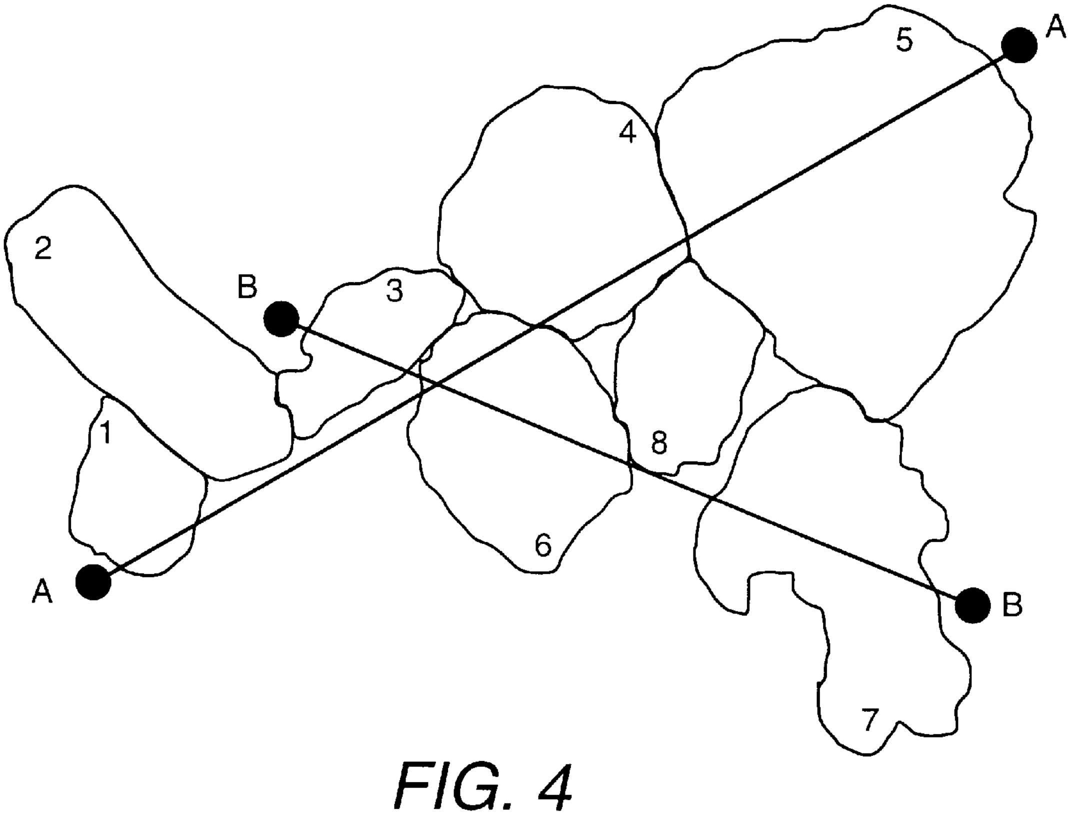
FIG. 4 is another tracing of the color photograph of the various titanium sponge fragments, showing approximate scanning lines for color analysis.

The RGB data obtained when the image was digitized with the frame grabber was transformed into HSI color space (i.e., an HSI coordinate system), using PC/Image Software, available from Foster-Findlay Associates, Version 2. This type of software was used to generate profiles of the HSI color values along selected scan lines taken through the group of samples placed on the substrate, as depicted in FIG. 4. Each line was extended through the approximate center of the exposed surface of each sample, so that the largest portion of each sample was traversed. Numerals have been provided in FIG. 4 to designate each sample.

Figure 5:
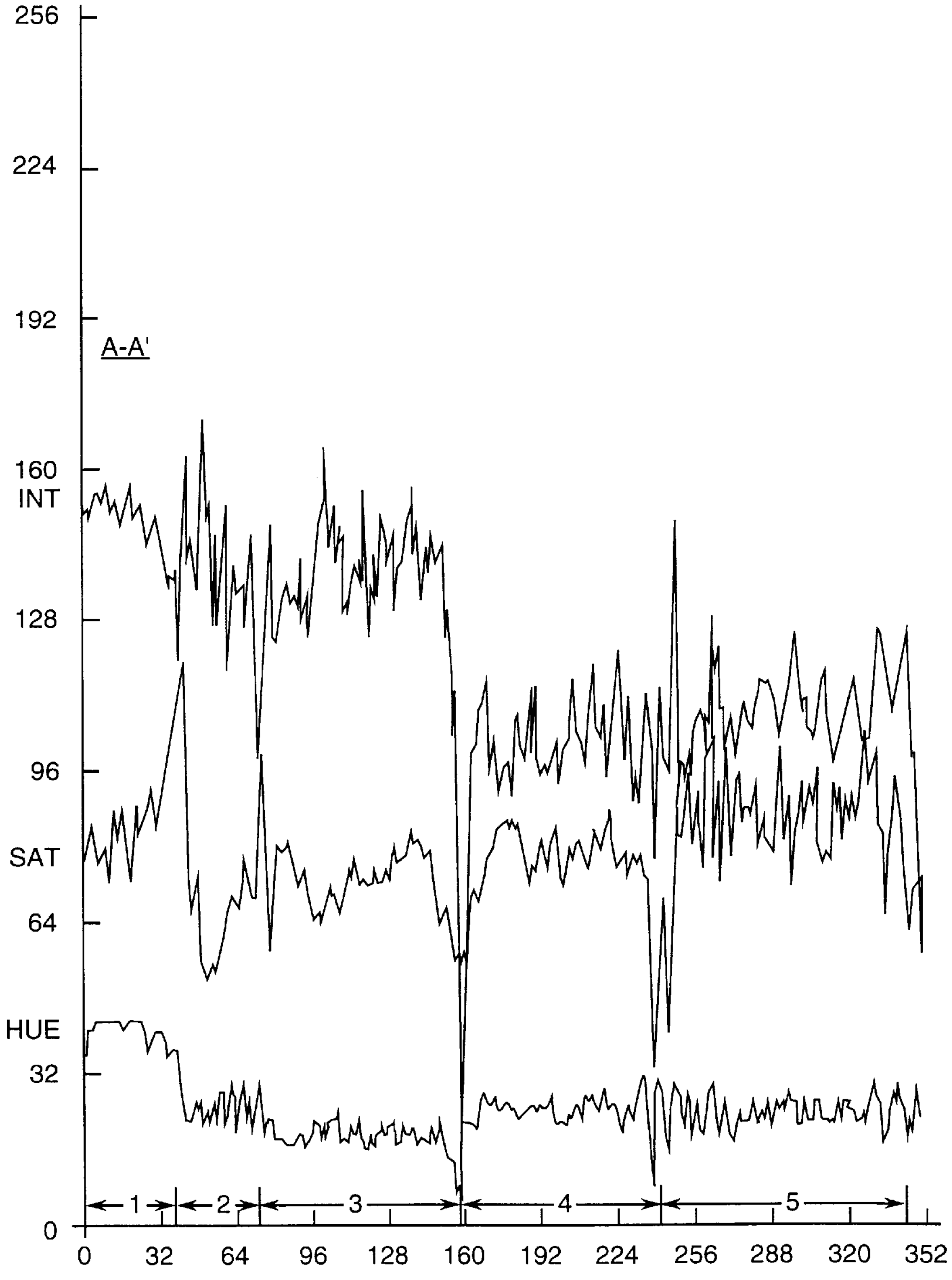
FIG. 5 is a line plot of color values associated with the color image of various titanium sponge fragments.

Line A–A' traversed samples 1, 2, 3, 4, and 5, and FIG. 5 is a line plot of color values associated with that line. The X-axis represents linear pixel values, beginning with the edge of sample 1 (see FIG. 4) which is farthest from sample 2. A cursor coordinated with the computer image of the samples was used to demarcate the individual samples. The upper, parallel X-axis line depicts the approximate pixel boundaries between samples. As the samples were traversed, pixels are also traversed. At each pixel, there is a value of H, S and I plotted. The Y-axis in FIG. 5 represents the particular bit value for each color space. The plots are designated along the Y-axis as follows: "INT"=intensity; "SAT"=saturation; and "HUE"=hue.

As sample 1, a yellow-colored fragment, is traversed, the hue value is about 40 bit "levels", saturation is about 90 bit levels, and intensity is about 150 bit levels, as shown in FIG. 5 (all values are averages). As the line scan moves over sample 2, a brown-gray colored sample, the intensity drops to about 50 bit levels; the hue drops to about 21 bit levels, and the saturation increases to about 145 bit levels. This data clearly demonstrates the validity of a simple algorithm which can be constructed for a color sorting system which distinguishes yellow-colored fragments from brown-gray fragments: when intensity is higher than saturation, a yellow sample is present, and when intensity is lower than saturation, a brown-gray sample is present.

Moreover, further examination of the line plot of FIG. 5 reveals that in the case of samples 2,3 and 4, which are brown, gray, and reddish-brown, respectively, the saturation value is always greater than the intensity value. In the case of the yellow-colored sample 1, intensity is greater than saturation. In the case of the desirable, low-nitrogen sample 5 (as well as for sample 7, discussed below), which is silver/dull gray, intensity is also greater than saturation. Sometimes, it is convenient to express color space relationships in terms of a ratio. For example, it could be said that brown/gray/reddish-brown defects have a ratio of intensity to saturation (I/S) of less than 1, while the yellow-colored samples and the silver/dull gray (low nitrogen) samples have an I/S ratio greater than 1.

Thus, a first "pass" clearly divided the titanium sponge fragments into two groups: a first group which contains yellow-colored (high nitrogen) samples and the silver/dull gray low-nitrogen sample, and a second group which contains all other titanium fragments. The two types of titanium in the second group can be separated from each other in a second "pass" (designated as element 27 in FIG. 1). For example, observation along the hue curve in FIG. 5 shows that a yellow-colored fragment such as sample 1 has a hue value above about 32 bit levels, while the silver/dull gray sample 5 has a consistent hue value below about 32 bit levels. Thus, the yellow-colored fragments can readily be separated from the desired titanium fragments by use of a simple, hue-based algorithm.

As described in considerable detail above, this separation-related data can be electronically transferred by available techniques to an automated color sorting system, e.g., to one or more look-up tables which, in effect, "teach" the system to accept or reject fragments. Such a system can include the other elements described previously, which typically conclude with an output signal transmitted to a processor-controlled physical mechanism for rejecting or accepting each sample.

Example 2

Figure 6:
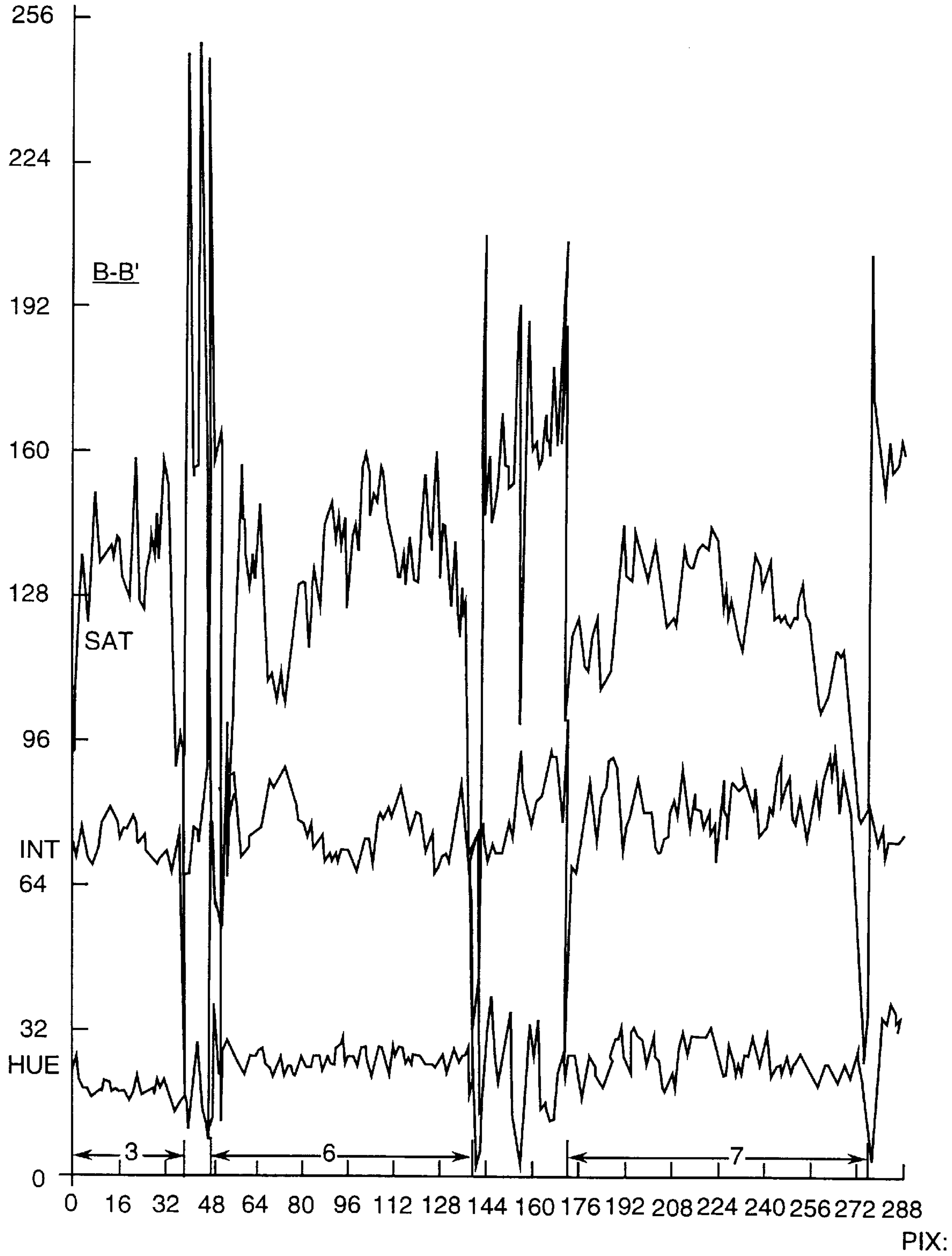
FIG. 6 is an additional line plot of color values associated with the color image of various titanium sponge fragments.
Figure 1:
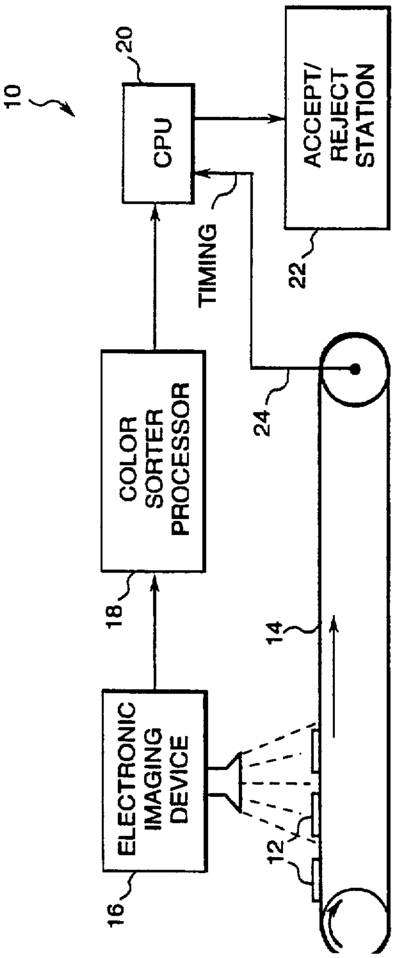
Figure 2:
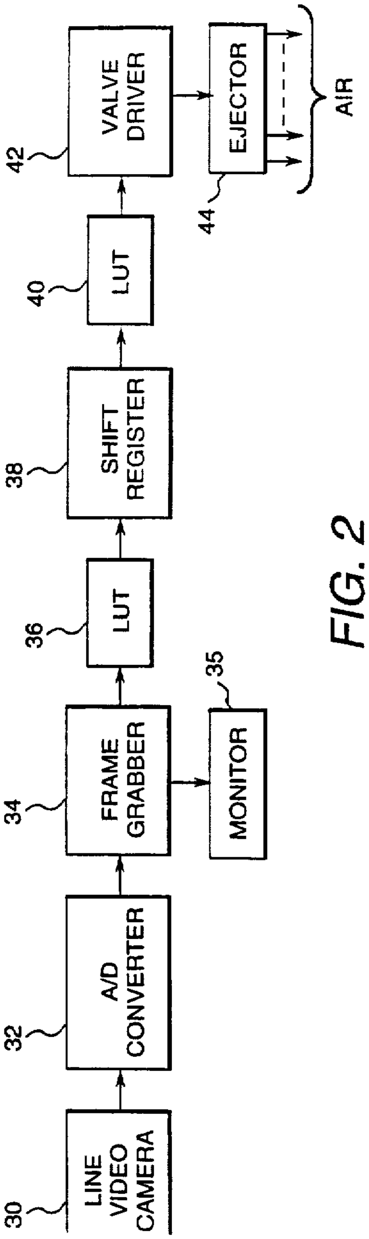

The image of the samples used in Example 1 was also utilized here. With reference to FIG. 4, the line B–B' was drawn, traversing samples 3,6 and 7 (the B endpoint of the line is closest to sample 3, while the B' endpoint is closest to sample 7.) FIG. 6 is a line plot for line B–B', with the same type of X- and Y-axes as in FIG. 5. As in Example 1, a cursor coordinated with the computer image of the samples was used to demarcate the individual samples.

Sample 7 had the desirable silver/dull gray color indicative of low nitrogen content, as in the case of sample 5, discussed previously. While sample 7 had a surface texture that was significantly different from that of sample 5, it could still be distinguished from samples 3 and 6 (both brown or reddish-brown), on an HSI basis. In other words, intensity was consistently higher than saturation for the low-nitrogen samples, and the reverse was true for the higher nitrogen (Mid-Nitrogen) samples 3 and 6.

Sample 8 was not traversed by lines A–A' or B–B', and its examination was not critical to the experiment. The color space associated with sample 8 could have been easily analyzed by drawing an additional line, e.g., a line C–C' across samples 4, 8 and 7, or across samples 6, 8 and 7.

Example 3

The ability to apply thresholding algorithms to distinguish samples of various colors is in part determined by the type of computer software used in conjunction with the imaging device and frame-grabber. One of the images obtained in Examples 1 and 2 was manipulated ("contrast manipulation") by conventional techniques, using an Adobe Photoshop™ computer imaging program. The manipulation provided an alternative RGB thresholding basis for analysis of the sponge fragments.

Binary representations in RGB color space were made for the resulting images. Threshold values were assigned to each color space, utilizing the Adobe Photoshop™ program. This type of program allows the user to interactively move a threshold value (e.g., a designated bit value for a particular color plane) higher or lower while viewing the fragment on the monitor. Adjustment of the threshold value for each color plane facilitates color identification and differentiation of the individual samples when the system is actually used in practice. The designated values for each color plane can be loaded into a look-up table, as described previously.

Using this thresholding technique, the following observations were made:

(1) A red threshold of about 135 bits effectively distinguished the group containing low-nitrogen titanium sponge fragments and yellow (high nitrogen) sponge fragments from all other titanium fragments.

(2) A green threshold above about 170 bits effectively identified the yellow sponge fragments.

(3) A blue threshold below about 60 bits effectively identified brown/gray/reddish-brown defects (mid-nitrogen) sponge fragments.

In general, various image-enhancement techniques may be utilized to minimize any possible problems caused by varying illumination. For example, a further distinction between specular-reflecting low-nitrogen sponge fragments and bright yellow, high-nitrogen fragments could be made by utilizing diffuse illumination to eliminate strong specular reflections on the low-nitrogen fragments. Moreover, spectrally-filtered illumination could prevent spectral illumination from imitating the bright yellow sponge fragments. Furthermore, spatial filtering could possibly be used to average and/or reject isolated specular reflections, i.e., to minimize the impact of "stray" or "shiny" pixels which have a dramatically different intensity than the surrounding pixels.

Since the boundaries of an individual fragment can readily be determined, tolerance parameters can also be incorporated into the computerized color sorting system. For example, the image of a particular fragment might show a relatively small, "defective" area, i.e., an area having a color indicative of mid-nitrogen or high nitrogen content. However, this small area may be a false reading due to specular reflection. To avoid an improper rejection of the fragment, an algorithm could be incorporated which retains the fragment if only a minimal level of "defective" color is present, e.g., less than 10% of the fragment's full image.

Preferred embodiments have been set forth for the purpose of illustration. However, the foregoing description should not be deemed to be a limitation on the boundaries of the invention. For example, many other variations and/or additions to the sorting systems described herein may occur to those skilled in color data acquisition and image processing.

Accordingly, various modifications, adaptations, and alternatives to the teachings herein may occur to one skilled in the art without departing from the spirit and scope of the present invention.

All of the patents, articles, and texts mentioned above are incorporated herein by reference.

We claim:

1. A method for sorting fragments of titanium-based sponge on the basis of color, comprising the steps of capturing at least one color image of each titanium fragment, wherein a set of color values is associated with each color image, and then inserting the relevant color values from the image into an automated color-sorting device to determine the color of the fragment, and segregating the fragments according to color or range-of-color, by way of a physical segregation apparatus controlled by the color sorting device.

2. The method of claim 1, wherein said at least one color image of each fragment is captured by at least one video camera.

3. The method of claim 1, wherein each captured color image is in the form of separate outputs of the colors red, blue, and green.

4. The method of claim 1, wherein one set of the relevant color values corresponds to hue, intensity, and saturation.

5. The method of claim 1, wherein the color-sorting is based on the predicted nitrogen content of the titanium-based sponge fragments.

6. The method of claim 5, wherein substantially all of the fragments which have a nitrogen content of at least about 1 wt. % are separated from the fragments which have a lower nitrogen content.

7. A method for sorting fragments of titanium-based sponge on the basis of color, comprising the steps of:

(A) capturing at least one color image of each titanium fragment as the fragment is advanced on a moving surface;

(B) converting the color image to color signals;

(C) executing a transformation of the color signals into at least one set of selected color values by way of a responsive processor;

(D) comparing the set of selected color values to addressable memory locations in a look-up table, wherein the memory locations have been constructed to correspond to the set of color values for titanium fragments, with a data set stored at each memory location indicating a fragment has acceptable or rejectable color values;

(E) reading out the data set to determine which fragments are to be processed as acceptable or rejectable color values; and (F) controlling the course of titanium fragments on the moving source, based on the read-out data, to separate the fragments on the basis of the color values.

8. The method of claim 7, wherein one set of color values obtained in step (C) corresponds to hue, intensity, and saturation.

9. The method of claim 7, further including the step of expanding around a central color value a range of color values for the color value set being compared in step (D), wherein the range of color values is stored as data in corresponding look-up table locations, said expansion compensating for any system noise, range-of-color variations, or range-of-optical variations.

10. The method of claim 7, wherein each color image captured in step (A) is delivered in the form of separate outputs of the colors red, blue, and green.

11. The method of claim 7, wherein the moving surface on which the fragments are advanced comprises a conveyor belt.

12. The method of claim 7, wherein step (A) is carried out in an illuminated environment which minimizes deviations in perceived color resulting from specular reflection on the fragment.

13. The method of claim 12, wherein the illumination is diffuse.

14. The method of claim 7, wherein said at least one color image of each fragment is captured by at least one video camera.

15. The method of claim 14, wherein a charge-coupled device is attached to or built into the video camera.

16. The method of claim 14, wherein titanium fragments are advanced on multiple sorting lanes, each of which is exposed to the view of at least one video camera.

17. The method of claim 7, wherein the color-sorting is based on the predicted nitrogen content of the titanium-based sponge fragments.

18. The method of claim 17, wherein substantially all of the fragments which have a nitrogen content of at least about 1 wt. % are separated from the fragments which have a lower nitrogen content.

19. A titanium-based alloy comprising titanium metal prepared from titanium sponge fragments having a nitrogen content less than about 1 wt. %, separated according to claim 18.

* * * * *

UNITED STATES PATENT AND TRADEMARK OFFICE
CERTIFICATE OF CORRECTION

PATENT NO. : 5,924,575

DATED : July 20, 1999

INVENTOR(S) : Gigliotti, Jr., et al

It is certified that error appears in the above-identified patent and that said Letters Patent is hereby corrected as shown below:

Please replace Sheet 1 of 4 of the drawings with the attached sheet.

Signed and Sealed this

Twenty-second Day of May, 2001

*Attest:*

NICHOLAS P. GODICI

*Attesting Officer*

*Acting Director of the United States Patent and Trademark Office*